(12) United States Patent
Chaney (10) Patent No.: US 11,570,951 B2
(45) Date of Patent: Feb. 7, 2023

(54) FORAGE HARVESTER WITH PROCESSING COMPONENT PROTECTION

(71) Applicant: DEERE & COMPANY, Moline, IL (US)

(72) Inventor: Nathan A. Chaney, Bloomfield, IA (US)

(73) Assignee: DEERE & COMPANY, Moline, IL (US)

( * ) Notice: Subject to any disclaimer, the term of this patent is extended or adjusted under 35 U.S.C. 154(b) by 440 days.

(21) Appl. No.: 16/720,027

(22) Filed: Dec. 19, 2019

(65) Prior Publication Data

US 2021/0185920 A1 Jun. 24, 2021

(51) Int. Cl.
*A01D 75/18* (2006.01)
*A01D 43/08* (2006.01)
*A01D 57/26* (2006.01)

(52) U.S. Cl.
CPC ......... *A01D 75/187* (2013.01); *A01D 43/085* (2013.01); *A01D 57/26* (2013.01); *A01D 43/087* (2013.01)

(58) Field of Classification Search
CPC ... A01D 75/187; A01D 43/085; A01D 43/087
See application file for complete search history.

(56) References Cited

U.S. PATENT DOCUMENTS

| | | | |
|---|---|---|---|
| 3,675,660 A * | 7/1972 | Girodat | A01F 12/16 460/106 |
| 3,995,783 A | 12/1976 | Bertrand et al. | |
| 4,799,625 A | 1/1989 | Weaver, Jr. et al. | |
| 4,934,612 A * | 6/1990 | Johnson | B24B 3/368 241/101.77 |
| 5,083,976 A | 1/1992 | McClure et al. | |
| 5,704,199 A | 1/1998 | Paquet et al. | |
| 7,207,165 B2 * | 4/2007 | Crego | A01F 12/16 56/10.2 J |

(Continued)

FOREIGN PATENT DOCUMENTS

| | | |
|---|---|---|
| DE | 3023688 A1 | 1/1982 |
| EP | 1731019 A1 | 12/2006 |
| EP | 1972191 A1 | 9/2008 |

OTHER PUBLICATIONS

European Search Report issued in counterpart application No. 20208425.7 dated May 14, 2021 (09 pages).

*Primary Examiner* — Thomas B Will
*Assistant Examiner* — Joan D Misa (57) ABSTRACT

A forage harvester includes a shear bar and a panel that directs the crop material downstream of the shear bar. A processing component is disposed downstream of the panel. An impact sensor is coupled to the shear bar and operable to detect data related to a magnitude of a force applied to the shear bar. The panel is moveable from a first position to a second position. The first position of the panel forms a channel for directing the crop material in the direction of crop processing along a first path toward the processing component. The second position of the panel alters the channel to direct the crop material along an alternative path not including the processing component. In response to a sufficiently high impact force applied to the shear bar by debris moving with the crop material, the panel is moved from the first position to the second position.

18 Claims, 4 Drawing Sheets

(56) References Cited

U.S. PATENT DOCUMENTS 8,250,842 B2 * 8/2012 Brockhan-Luedemann ................ A01D 34/62
73/104
2006/0277883 A1 * 12/2006 Berger ................ A01D 75/187
56/10.2 J

* cited by examiner

FORAGE HARVESTER WITH PROCESSING COMPONENT PROTECTION

TECHNICAL FIELD

The disclosure generally relates to a forage harvester, and a method of operating a forage harvester.

BACKGROUND

A forage harvester gathers crop material and directs the crop material to a pair of opposing feed rollers. The crop material is fed between the opposing feed rollers. The feed rollers counter-rotate relative to each other to move the crop material in a direction of crop processing, which is generally rearward relative to a direction of travel of the forage harvester. The feed rollers move the crop toward a cutter head. The cutter head includes a rotating drum with a plurality of knives disposed on the periphery of the drum. The cutter head cooperates with a shear bar to cut the crop material into small pieces.

The forage harvester includes one or more panels that form a channel that direct the crop material from the cutter head toward additional processing components. The additional processing components may include, but are not limited to, a kernel processor, a crop accelerator, a spout transition, or a discharge spout.

Debris, e.g., rocks, stones, steel bars, etc., may be gathered with the crop material and moved along with the crop material. Debris contacting the cutter head may cause damage to the knives thereon, possibly causing the knives or portions thereof to break off. If the debris and/or portions of the knives are passed beyond the cutter head to the additional processing components, severe damage may be caused to the additional processing components.

SUMMARY

A forage harvester is provided. The forage harvester includes a feeder that is operable to move crop material in a direction of crop processing. A shear bar is located downstream of the feeder relative to the direction of crop processing of the crop material. The forage harvester includes a panel that directs the crop material downstream of the shear bar relative to the direction of crop processing of the crop material. A processing component is disposed downstream of the panel relative to the direction of crop processing of the crop material. An impact sensor is coupled to the shear bar. The impact sensor is operable to detect data related to a magnitude of a force applied to the shear bar. The panel is moveable from a first position to a second position in response to the impact sensor detecting an impact force having a magnitude greater than a defined limit. The first position of the panel forms a channel for directing the crop material in the direction of crop processing along a first path toward the processing component. The second position of the panel alters the channel to direct the crop material along an alternative path not including the processing component.

In one aspect of the disclosure, a controller is disposed in communication with the impact sensor. The controller receives data from the impact sensor related to the detection and magnitude of the impact force. The controller is operable to control movement of the panel from the first position to the second position.

In one aspect of the disclosure, a fastener is coupled to and operatively controlled by the controller for movement between a first configuration and a second configuration. The first configuration of the fastener is configured to secure the panel in the first position, whereas the second configuration of the fastener is configured to enable movement of the panel from the first position to the second position. In one embodiment, the fastener is a frangible fastener in which the first configuration of the fastener is an unbroken configuration, and the second configuration of the fastener is a broken configuration. In one example embodiment, the frangible fastener is a pyrotechnic fastener. However, it should be appreciated that the frangible fastener may include a fastener device and/or system other than the example pyrotechnic fastener. In another embodiment of the disclosure, the fastener includes a latch mechanism in which the first configuration of the fastener is a latched configuration, and the second configuration of the fastener is an un-latched configuration.

In one aspect of the disclosure, the forage harvester includes a cutter head. The cutter head is rotatable about an axis of rotation and cooperates with the shear bar to cut the crop material. The cutter head includes a drum having a plurality of knives disposed circumferentially about the drum.

In one aspect of the disclosure, the panel is located adjacent to or immediately downstream of the cutter head relative to the direction of crop processing of the crop material. For example, the panel may include, cut is not limited to, a spiral band that cooperates with the cutter head, or a crop chute disposed immediately downstream of the spiral band. The second position of the panel may include a detached position and/or a lowered position, such that the crop material and any debris moving therewith is immediately directed toward a ground surface to prevent any debris moving with the crop material from contacting the downstream processing component.

In one aspect of the disclosure, the processing component may include, but is not limited to, a kernel processor, a crop accelerator, a spout transition, or a discharge spout. The kernel processor may include a pair of processing rolls that are counter-rotated to further process the crop material, e.g., kernels of corn. The crop accelerator may include a plurality of paddles that accelerate the crop material. The spout transition directs the crop material into the discharge spout. The discharge spout directs the crop material away from the forage harvester, and into a storage device, such as a truck and/or trailer.

By way of example, debris contacting the pair of processing rolls and/or forced therebetween may do extensive damage to the processing rolls. As such, by moving the panel to the second position as soon as the impact sensor detects an impact of sufficient force, such as when a rock or steel bar contacts the shear bar, the flow of crop material and any debris that may damage the processing rolls is directed toward the ground surface, thereby protecting the processing rolls from damage. In the same manner, the other downstream processing components may also be protected.

In one aspect of the disclosure, the feeder includes a pair of opposing feed rollers that are counter-rotated to move the crop material therebetween. Rotation of the feed rollers may be halted in response to the magnitude of the impact force being greater than the defined limit.

In one aspect of the disclosure, the impact sensor includes, but is not limited to, a force sensor, a movement sensor, an accelerometer, or a strain sensor. It should be appreciated that the impact sensor may include any device that is capable of sensing and/or measuring data that may indicate a magnitude of a force applied to the shear bar.

A method of operating the forage harvester is also provided. The method includes detecting data related to a magnitude of an impact force applied to the shear bar, with the impact sensor. The data related to the detected impact force is communicated from the impact sensor to the controller. The controller may then determine if the magnitude of the detected impact force is greater than a defined limit. When the controller determines that the magnitude of the detected impact force is greater than the defined limit, the controller moves the panel from the first position to the second position. The first position of the panel at least partially forms a channel for directing crop material in a direction of crop processing along a first path toward a downstream processing component. The second position of the panel alters the channel to direct the crop material along an alternative path not including the downstream processing component. When the panel is positioned in the second position, any debris moving with the crop material is diverted away from the downstream processing component to prevent damage to the downstream processing component from the debris.

In one aspect of the disclosure, the step of moving the panel from the first position to the second position includes fracturing a frangible fastener with the controller to release the panel. In one embodiment, the frangible fastener includes a pyrotechnic fastener, with the step of fracturing the frangible fastener including detonating the pyrotechnic fastener.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
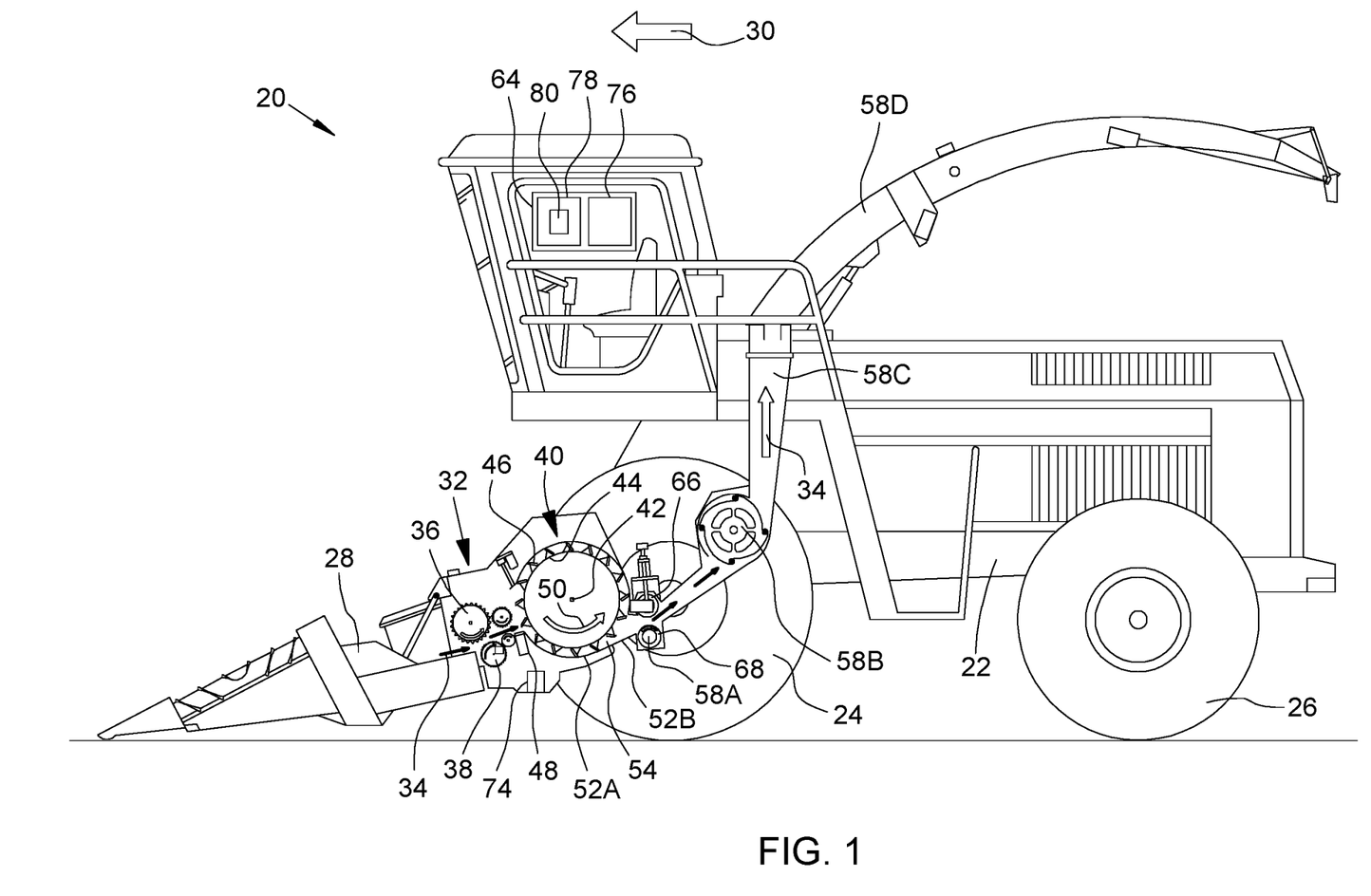
FIG. 1 is a schematic elevation view of a forage harvester.

Referring to the Figures, wherein like numerals indicate like parts throughout the several views, a forage harvester is generally shown at 20. Referring to FIG. 1, the forage harvester 20 includes a frame 22, which supports the various components thereof. The frame 22 rotatably supports a plurality of ground engaging elements, such as but not limited to a pair of front wheels 24 and a pair of rear wheels 26. In the example embodiment shown in FIG. 1 and described herein, the front wheels 24 are drive wheels and the rear wheels 26 are steerable wheels. However, it should be appreciated that the ground engaging elements and the propulsion and steering thereof, may differ from the example embodiment shown in FIG. 1 and described herein.

Referring to FIG. 1, the forage harvester 20 includes a head unit 28 disposed at the forward end of the forage harvester 20, relative to a direction of travel 30 of the forage harvester 20 when gathering crop material 72. The head unit 28 is attached to and supported by the frame 22. The configuration and operation of the head unit 28 may vary depending upon the crop material 72 being gathered. FIG. 1 shows a head unit 28 operable for cutting and gathering standing corn. It should be appreciated that the head unit 28 may differ for other crop materials 72, such as grasses or other crop materials 72. The different configurations and operation of the different head units 28 are known to those skilled in the art, are not pertinent to the teachings of this disclosure, and are therefore not described in detail herein.

Referring to FIG. 1, the forage harvester 20 includes a feeder 32. The feeder 32 is operable to move crop material 72 gathered by the head unit 28 in a direction of crop processing 34. The direction of crop processing 34 is generally directed rearward and possibly laterally relative to the direction of travel 30 of the forage harvester 20 when gathering crop material 72. In the example embodiment described herein, the feeder 32 may include a pair of opposing feed rollers, i.e., an upper feed roller 36 and a lower feed roller 38. The upper feed roller 36 and the lower feed roller 38 are spaced apart from each, with the gathered crop material 72 fed between the upper feed roller 36 and the lower feed roller 38. The upper feed roller 36 and the lower feed roller 38 are counter-rotated relative to teach other to move the crop material 72 therebetween. The specific details and operation of the feeder 32 are known to those skilled in the art, are not pertinent to the teachings of this disclosure, and are therefore not described in greater detail herein. Furthermore, the configuration and operation of the feeder 32 may differ from the example embodiment shown in the Figures and described herein.

Referring to FIG. 1, the forage harvester 20 further includes a cutter head 40. The cutter head 40 is rotatably attached to the frame 22 and is rotatable about an axis of rotation 42. The axis of rotation 42 of the cutter head 40 is generally perpendicular to the direction of travel 30 of the forage harvester 20 while gathering crop material 72, and generally perpendicular to the direction of crop processing 34. The example embodiment of the cutter head 40 shown in the Figures and described herein includes a cylindrical drum 44 having a plurality of knives 46 disposed circumferentially about the outer periphery of the drum 44.

Referring to FIG. 1, a shear bar 48 is located immediately downstream of the feeder 32 relative to the direction of crop processing 34 of the crop material 72. The shear bar 48 is attached to and supported by the frame 22. The cutter head 40 cooperates with the shear bar 48 to cut the crop material 72 into smaller pieces. The drum 44 of the cutter head 40 rotates in a rotational direction 50 about its axis of rotation 42, with the knives 46 oriented to cut the crop material 72 when the drum 44 rotates. The shear bar 48 braces the crop material 72 against the cutting action of the knives 46 to facilitate the cutting of the crop material 72. The specific features and operation of the cutter head 40 and its relation to the shear bar 48 with regard to cutting the crop material 72 are known to those skilled in the art and are therefore not described in greater detail herein.

Figure 3:
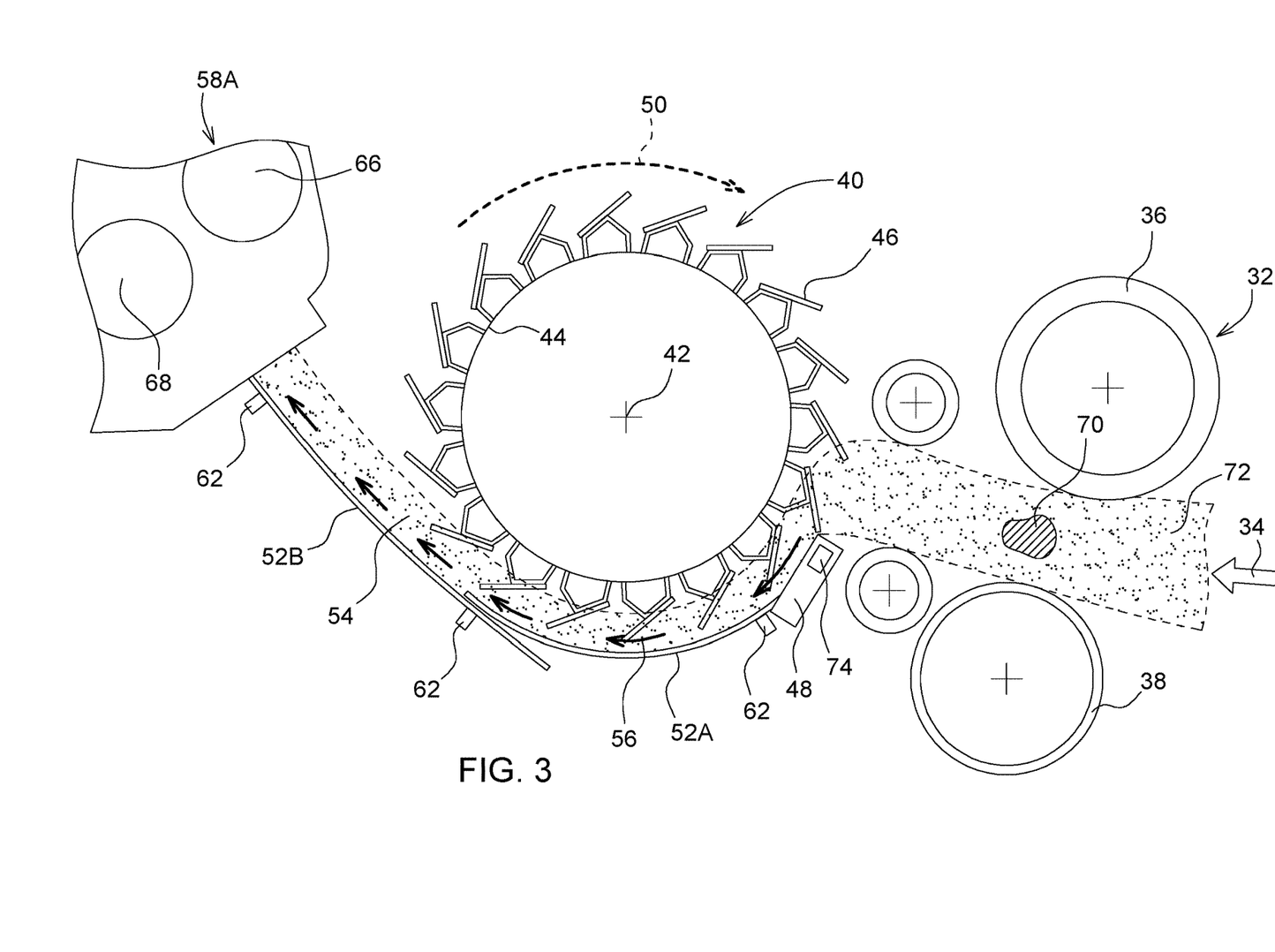
FIG. 3 is a schematic elevation view of a portion of the crop processing components of the forage harvester showing a panel in a first position.
Figure 4:
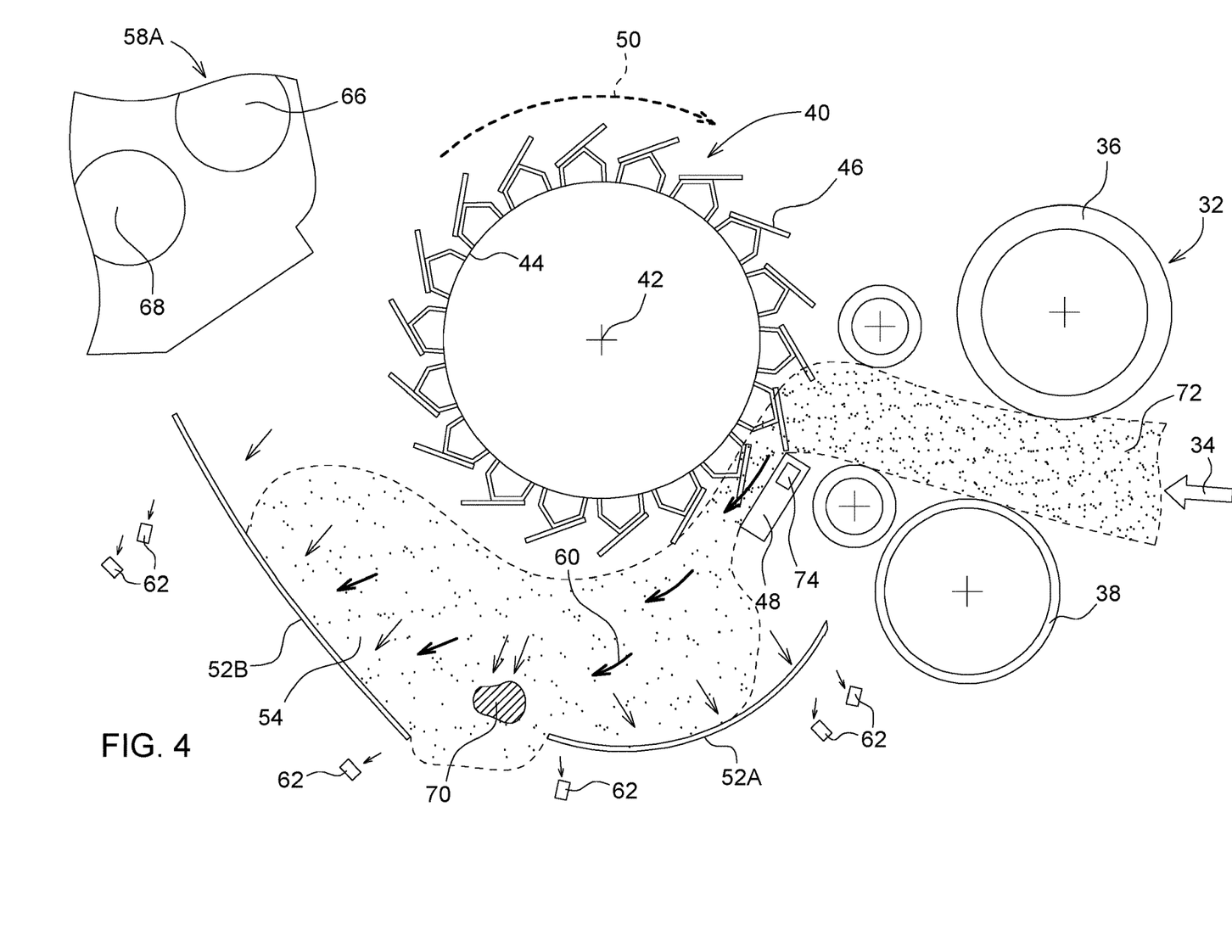
FIG. 4 is a schematic elevation view of the portion of the crop processing components of the forage harvester showing the panel in a second position.

As best shown in FIGS. 3 and 4, the forage harvester 20 includes at least one panel 52A, 52B that is attached to and moveable relative to the frame 22. It should be appreciated that the panel 52A, 52B may include multiple panels 52A, 52B. While only a single panel 52A, 52B is described herein, it should be appreciated that the teachings of the disclosure may be applied to multiple panels 52A, 52B of the forage harvester 20. The panel 52A, 52B is configured for directing the crop material 72 downstream of the shear bar 48 relative to the direction of crop processing 34 of the crop material 72. In one example embodiment, the panel 52A, 52B is located adjacent to or immediately downstream of the cutter head 40 relative to the direction of crop processing 34 of the crop material 72. For example, the panel 52A, 52B may include a spiral band panel 52A disposed opposite the cutter head 40, or a crop chute panel 52B disposed immediately downstream of the spiral band panel 52A relative to the direction of crop processing 34. While the spiral band panel 52A and the crop chute panel 52B are examples of the panel 52A, 52B described herein, it should be appreciated that the panel 52A, 52B may be located at a position other than the example locations of the spiral band panel 52A and the crop chute panel 52B shown in the Figures and described herein.

As noted above, the panel 52A, 52B is attached to and moveable relative to the frame 22. The panel 52A, 52B is moveable relative to the frame 22 from a first position, shown in FIG. 3, to a second position, shown in FIG. 4. Referring to FIG. 3, the first position of the panel 52A, 52B at least partially forms a channel 54 for directing the crop material 72 in the direction of crop processing 34 along a first path 56 toward a downstream processing component 58A, 58B, 58C, 58D (described in greater detail below). Referring to FIG. 4, the second position of the panel 52A, 52B alters the channel 54 to direct the crop material 72 along an alternative path 60 not including the downstream processing component 58A, 58B, 58C, 58D.

In one embodiment, the panel 52A, 52B is attached to the frame 22 with one or more fasteners 62. The fastener 62 is moveable between a first configuration, shown in FIG. 3, and a second configuration, shown in FIG. 4. Referring to FIG. 3, the first configuration of the fastener 62 is configured to secure the panel 52A, 52B in the first position. Referring to FIG. 4, the second configuration of the fastener 62 is configured to enable movement of the panel 52A, 52B from the first position to the second position. The panel 52A, 52B may be secured with a single fastener 62, or with multiple fasteners 62. Additionally, it should be appreciated that other features may be used in combination with the fastener 62 to secure the panel 52A, 52B relative to the frame 22, such as but not limited to a hinge connection or the like. The fastener 62 may be coupled to and operatively controlled by a controller 64 (described in greater detail below) for movement between the first configuration and the second configuration.

In one example, such as shown in FIGS. 3 and 4, the fastener 62 is a frangible fastener 62 in which the first configuration of the fastener 62 is an unbroken configuration, and the second configuration of the fastener 62 is a broken configuration. An example of a frangible fastener 62 includes, but is not limited to, a pyrotechnic fastener 62. As is understood by those skilled in the art, a pyrotechnic fastener 62 includes a fastener 62, usually a nut or bolt, that incorporates a pyrotechnic charge that can be initiated remotely. One or more explosive charges embedded within the fastener 62 are typically activated by an electric current or other suitable control signal. The explosive charge breaks the fastener 62 into two or more pieces. The fastener 62 may be scored around its circumference at a location(s) where the breaking of the fastener 62 should occur. While the pyrotechnic fastener 62 is an example of the frangible fastener 62, it should be appreciated that the frangible fastener 62 may be configured in some other manner than enables the controlled fracture or breaking of the fastener 62.

In an alternative embodiment, the fastener 62 includes a latch mechanism in which the first configuration of the fastener 62 is a latched configuration, and the second configuration of the fastener 62 is an un-latched configuration. The latch mechanism may be configured in any suitable manner that enables controlled movement of the latch mechanism from the first configuration to the second configuration. For example, the latch mechanism may include an actuator that may be controlled in response to a control signal to move the latch mechanism from the first configuration to the second configuration. The actuator may include an electronic switch, a solenoid, a pneumatic actuator, a hydraulic actuator, an electric actuator, etc. The panel 52A, 52B may be secured with multiple latch mechanisms, or with a single latch mechanism.

Figure 2:
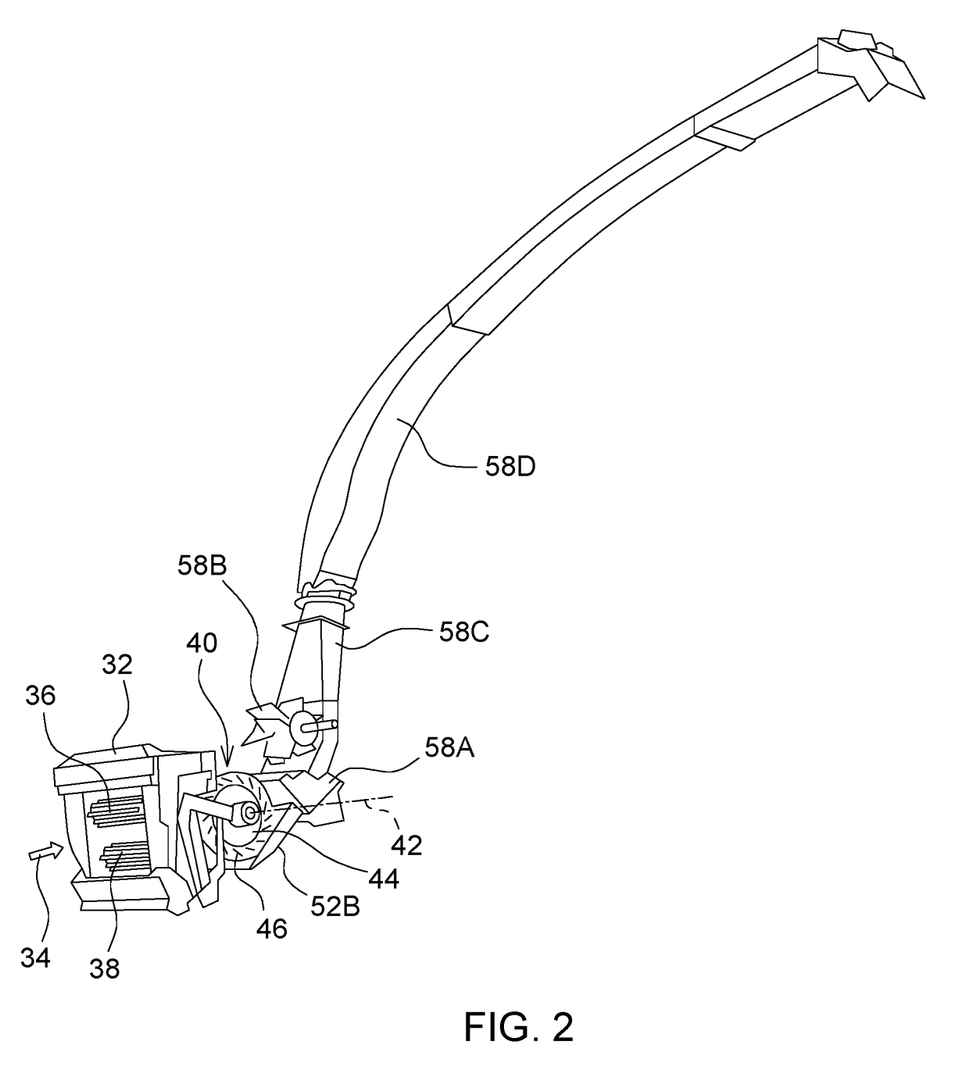
FIG. 2 is a schematic perspective view showing crop processing components of the forage harvester.

Referring to FIGS. 1 and 2, and as noted above, the forage harvester 20 further includes a processing component 58A, 58B, 58C, 58D that is disposed downstream of the panel 52A, 52B relative to the direction of crop processing 34 of the crop material 72, i.e., the downstream processing component 58A, 58B, 58C, 58D. The processing component 58A, 58B, 58C, 58D may include, but is not limited to, a kernel processor 58A, a crop accelerator 58B, a spout transition 58C, or a discharge spout 58D. It should be appreciated that the downstream processing component 58A, 58B, 58C, 58D may include any feature or device that may be significantly damaged by a hard piece of debris 70 moved with the crop material 72 along, such as but not limited to, a rock, a metal bar, a metal post, a knife from the cutter head 40, etc. For example, with reference to FIG. 1, as is understood in the art, the kernel processor 58A includes a pair of opposing processing rolls, i.e., a first processing roll 66 and a second processing roll 68. The first processing roll 66 and the second processing roll 68 are counter-rotated to further process the crop material 72, e.g., kernels of corn. The first processing roll 66 and the second processing roll 68 are separated by a small gap, e.g., approximately 2.0 mm, and are biased together. Each of the first processing roll 66 and the second processing roll 68 may include teeth, ridges, valleys, etc., that help crack the kernels and other crop material 72 to improve digestibility. If debris 70 were to enter between the first processing roll 66 and the second processing roll 68, the debris 70 may do significant and/or extensive damage, requiring costly and time-consuming repairs. Similar to the kernel processor 58A, debris 70 moving with the crop material 72 may damage the crop accelerator 58B, the spout transition 58C, the discharge spout 58D, or some other downstream processing component 58A, 58B, 58C, 58D not specifically shown in the Figures are described herein.

Referring to FIG. 1, an impact sensor 74 is coupled to the shear bar 48. The impact sensor 74 is operable to detect data related to a magnitude of a force applied to the shear bar 48. The data detected by the impact sensor 74 may include data that directly measures the magnitude of a force applied to the shear bar 48, or indirectly indicates the magnitude of a force applied to the shear bar 48. For example, the impact sensor 74 may include, but is not limited to a force sensor that directly measures the force applied to the shear bar 48, a movement sensor that measures movement of the shear bar 48 in response to the applied force, an accelerometer that measures the acceleration of the shear bar 48 in response to the applied force, or a strain sensor that measures the strain in the shear bar 48 in response to the applied force. It should be appreciated that the impact sensor 74 may include some other type of sensor not described herein.

In one embodiment, with reference to FIG. 1, the forage harvester 20 may further include the controller 64. The controller 64 is disposed in communication with the impact sensor 74 for receiving the data related to the detection and magnitude of the impact force. The controller 64 may alternatively be referred to as a computing device, a computer, a module, a control module, a control unit, etc. The controller 64 is operable to control the operation of the panel 52A, 52B. More specifically, the controller 64 is operable to control movement of the panel 52A, 52B from the first position to the second position. The controller 64 includes a processor 76, a memory 78, and all software, hardware, algorithms, connections, sensors, etc., necessary to manage and control the operation of the panel 52A, 52B. As such, a method may be embodied as a program or algorithm operable on the controller 64. It should be appreciated that the controller 64 may include any device capable of analyzing data from various sensors including the impact sensor 74, comparing data, making the necessary decisions required to control the operation of the panel 52A, 52B, and executing the required tasks necessary to control the operation of the panel 52A, 52B.

The controller 64 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (ND) circuitry, digital-to-analog (D/A) circuitry, and any required input/output (I/O) circuitry, I/O devices, and communication interfaces, as well as signal conditioning and buffer electronics.

The computer-readable memory 78 may include any non-transitory/tangible medium which participates in providing data or computer-readable instructions. Memory 78 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller 64 includes the tangible, non-transitory memory 78 on which are recorded computer-executable instructions, including a component protection algorithm 80. The processor 76 of the controller 64 is configured for executing the component protection algorithm 80. The component protection algorithm 80 implements a method of operating the forage harvester 20 to protect the downstream processing components 58A, 58B, 58C, 58D from damage that may be caused by the unintended debris 70 moving with the crop material 72.

As described above, the panel 52A, 52B is moveable relative to the frame 22 from the first position to the second position. The panel 52A, 52B is moved in response to the impact sensor 74 detecting an impact force that is applied to the shear bar 48 and includes a magnitude greater than a defined limit. It should be appreciated that debris 70 gathered with the crop material 72 by the head unit 28 may be moved with the crop material 72 through the feeder 32 and contact the shear bar 48 and cutter head 40. The debris 70 may directly contact the shear bar 48 thereby imparting an applied force to the shear bar 48, or may be forced against the shear bar 48 by one or more of the knives 46 on the drum 44 of the cutter head 40 contacting the debris 70 during rotation, thereby imparting an applied force to the shear bar 48. Either way, debris 70 having sufficient size and a sufficient hardness that moves with the flow of crop material 72 will impart a force onto the shear bar 48 that is larger than a normal operating force that the shear bar 48 is subjected to under normal operating conditions when processing crop material 72. The impact sensor 74 detects data related to the magnitude of the force applied to the impact sensor 74. The controller 64 may use the data to calculate the magnitude of the force applied to the shear bar 48. When the magnitude of the force applied to the shear bar 48 is greater than the defined limit, the panel 52A, 52B is moved from the first position to the second position.

As noted above and shown in FIG. 3, the first position of the panel 52A, 52B forms the channel 54 for directing the crop material 72 in the direction of crop processing 34 along the first path 56 toward the downstream processing component 58A, 58B, 58C, 58D. The first position may be considered a normal operating position of the panel 52A, 52B for processing the crop material 72. As shown in FIG. 4, the second position of the panel 52A, 52B alters the channel 54 to direct the crop material 72 along the alternative path 60 not including the processing component 58A, 58B, 58C, 58D. The second position may be considered a bypass or dump position. The alternative path 60 may include, for example, a path to the ground surface. When the panel 52A, 52B is moved to the second position, the crop material 72 and the debris 70 moving with the crop material 72 are directed along the alternative path 60, and not the first path 56. As such, any debris 70 that is moving with the crop material 72 is directed along the alternative path 60, e.g., to the ground, thereby diverting the debris 70 from moving along the first path 56 and preventing the debris 70 from contacting or engaging the downstream processing components 58A, 58B, 58C, 58D. By dumping the debris 70 that is moving with the crop material 72 from the channel 54 and/or diverting the debris 70 from the first path 56, the downstream processing components 58A, 58B, 58C, 58D of the forage harvester 20 are protected from damage that may have been caused by the debris 70.

In one embodiment, it is contemplated that the impact sensor 74 may be mechanically linked to the panel 52A, 52B, such that detection of the impact force having a magnitude greater than the defined limit automatically triggers movement of the panel 52A, 52B from the first position to the second position. In another embodiment, described briefly above, the processor 76 of the controller 64 may execute the component protection algorithm 80 to implement the method of operating the forage harvester 20 to protect the downstream processing components 58A, 58B, 58C, 58D from damage that may be caused by unintended debris 70 moving with the crop material 72.

The method of operating the forage harvester 20 includes detecting the data related to the magnitude of the impact force applied to the shear bar 48. As noted above, the data is detected and/or sensed with the impact sensor 74. The data sensed by the impact sensor 74 may then be communicated to the controller 64.

The controller 64 may then calculate the magnitude of the impact force applied to the shear bar 48, and determine if the magnitude of the detected impact force is equal to or less than the defined limit, or if the magnitude of the detected impact force is greater than the defined limit. The defined limit may include a force value that is indicative of an object striking the shear bar 48 that may be sufficiently large and/or hard enough to potentially cause damage to the downstream processing components 58A, 58B, 58C, 58D. It should be appreciated that the defined limit is larger than a normal operating force that the shear bar 48 is subjected to during normal operation of chopping the crop material 72.

When the magnitude of the detected impact force is greater than the defined limit, the controller 64 may then move the panel 52A, 52B from the first position to the second position. As described above, the first position of the panel 52A, 52B at least partially forms the channel 54 for directing crop material 72 in the direction of crop processing 34 along the first path 56 toward the downstream processing component 58A, 58B, 58C, 58D, whereas the second position of the panel 52A, 52B alters the channel 54 to direct the crop material 72 along the alternative path 60 not including the downstream processing component 58A, 58B, 58C, 58D. By moving the panel 52A, 52B to the second position, any debris 70 moving with the crop material 72 is diverted away from the downstream processing component 58A, 58B, 58C, 58D to prevent damage to the downstream processing component 58A, 58B, 58C, 58D from the debris 70.

In one embodiment, moving the panel 52A, 52B from the first position to the second position includes fracturing one or more of the frangible fasteners 62 with the controller 64 to release the panel 52A, 52B. As noted above, the frangible fasteners 62 may include the pyrotechnic fastener 62. As such, fracturing the frangible fastener 62 may include detonating or igniting the charge on the pyrotechnic fastener 62 to break the frangible fastener 62 into two or more pieces. The controller 64 may detonate the charge on the pyrotechnic fastener 62 by communicating an electrical signal to the charge of the pyrotechnic fastener 62.

The second position of the panel 52A, 52B may include a complete separation of the panel 52A, 52B from the forage harvester 20, in which case the panel 52A, 52B may completely drop to the ground by gravity. In other embodiments, the forage harvester 20 may include other components that accelerate the movement of the panel 52A, 52B from the first position into the second position, such that the panel 52A, 52B accelerates faster than the acceleration of gravity. In other embodiments, the panel 52A, 52B may be hinged along an edge, such that the panel 52A, 52B remains attached to the forage harvester 20 along the hinged edge, with an opposing edge dropping down.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A forage harvester comprising:
a feeder operable to move crop material in a direction of crop processing;
a shear bar located downstream of the feeder relative to the direction of crop processing of the crop material;
a panel configured for directing the crop material downstream of the shear bar relative to the direction of crop processing of the crop material;
a processing component disposed downstream of the panel relative to the direction of crop processing of the crop material;
an impact sensor coupled to the shear bar and operable to detect data related to a magnitude of a force applied to the shear bar;
wherein the panel is moveable from a first position to a second position in response to the impact sensor detecting an impact force having a magnitude greater than a defined limit, wherein the first position of the panel forms a channel for directing the crop material in the direction of crop processing along a first path toward the processing component, and wherein the second position of the panel alters the channel to direct the crop material along an alternative path not including the processing component;
a controller disposed in communication with the impact sensor for receiving data related to the detection and magnitude of the impact force, wherein the controller is operable to control movement of the panel from the first position to the second position;
a fastener coupled to and operatively controlled by the controller for movement between a first configuration and a second configuration, wherein the first configuration of the fastener is configured to secure the panel in the first position, and wherein the second configuration of the fastener is configured to enable movement of the panel from the first position to the second position; and
wherein the fastener is a frangible fastener in which the first configuration of the fastener is an unbroken configuration, and the second configuration of the fastener is a broken configuration.

2. The forage harvester set forth in claim 1, wherein the frangible fastener is a pyrotechnic fastener.

3. The forage harvester set forth in claim 1, further comprising a cutter head that is rotatable about an axis of rotation and cooperates with the shear bar to cut the crop material.

4. The forage harvester set forth in claim 3, wherein the cutter head includes a drum having a plurality of knives disposed circumferentially about the drum.

5. The forage harvester set forth in claim 3, wherein the panel is located adjacent to or immediately downstream of the cutter head relative to the direction of crop processing of the crop material.

6. The forage harvester set forth in claim 1, wherein the processing component includes a kernel processor, a crop accelerator, a spout transition, or a discharge spout.

7. The forage harvester set forth in claim 1, wherein the feeder includes a pair of opposing feed rollers counter-rotated to move the crop material therebetween.

8. The forage harvester set forth in claim 1, wherein the impact sensor includes a force sensor, a movement sensor, an accelerometer, or a strain sensor.

9. A forage harvester comprising:
a frame;
a shear bar attached to the frame;
a cutter head rotatably attached to the frame and rotatable about an axis of rotation, wherein the cutter head cooperates with the shear bar to cut crop material;
a panel moveable relative to the frame between a first position and a second position, wherein the first position of the panel at least partially forms a channel for directing the crop material along a first path, and wherein the second position of the panel alters the channel to direct the crop material along an alternative path;

an impact sensor coupled to the shear bar and operable to detect data related to a magnitude of a force applied to the shear bar;

a controller disposed in communication with the impact sensor for receiving data related to a magnitude of an impact force, wherein the controller is operable to move the panel from the first position to the second position in response to the magnitude of the impact force being greater than a defined limit; and comprising a frangible fastener moveable between a first configuration and a second configuration, wherein the first configuration of the frangible fastener is configured to secure the panel relative to the frame in the first position, and wherein the second configuration of the frangible fastener is configured to enable movement of the panel relative to the frame from the first position to the second position.

10. The forage harvester set forth in claim 9 wherein the first configuration of the frangible fastener is an unbroken configuration, and the second configuration of the frangible fastener is a broken configuration.

11. The forage harvester set forth in claim 9, further comprising a feeder attached to the frame and operable to move the crop material in a direction of crop processing of the crop material.

12. The forage harvester set forth in claim 9, further comprising a processing component disposed downstream of the panel relative to a direction of crop processing of the crop material, wherein the first path includes the processing component, and the second path does not include the processing component.

13. The forage harvester set forth in claim 12, wherein the processing component includes a kernel processor, a crop accelerator, a spout transition, or a discharge spout.

14. The forage harvester set forth in claim 9, wherein the panel is located adjacent to or immediately downstream of the cutter head relative to a direction of crop processing of the crop material.

15. The forage harvester set forth in claim 9, wherein the impact sensor includes a force sensor, a movement sensor, an accelerometer, or a strain sensor.

16. A forage harvester comprising:
a frame;
a shear bar attached to the frame;
a cutter head rotatably attached to the frame and rotatable about an axis of rotation, wherein the cutter head cooperates with the shear bar to cut crop material;
a panel moveable relative to the frame between a first position and a second position, wherein the first position of the panel at least partially forms a channel for directing the crop material along a first path, and wherein the second position of the panel alters the channel to direct the crop material along an alternative path; and
a frangible fastener moveable between a first configuration and a second configuration, wherein the first configuration of the frangible fastener is configured to secure the panel relative to the frame in the first position, and wherein the second configuration of the frangible fastener is configured to enable movement of the panel relative to the frame from the first position to the second position.

17. The forage harvester set forth in claim 16, further comprising an impact sensor coupled to the shear bar and operable to detect data related to a magnitude of a force applied to the shear bar.

18. The forage harvester set forth in claim 16, further comprising a controller disposed in communication with the impact sensor for receiving data related to a magnitude of an impact force, wherein the controller is operable to control the frangible fastener from the first configuration to the second configuration in response to the magnitude of the impact force being greater than a defined limit.

* * * * *